March 5, 1968     B. STEFANOV     3,372,326

HIGH EFFICIENCY LOW IRON AC-TO-REGULATED DC CONVERTER

Filed April 30, 1965

INVENTOR.
BORIS STEFANOV
BY
*Elliott & Pastoriza*
ATTORNEYS

United States Patent Office 3,372,326
Patented Mar. 5, 1968

3,372,326
HIGH EFFICIENCY LOW IRON AC-TO-
REGULATED DC CONVERTER
Boris Stefanov, 5628 Harold Way,
Los Angeles, Calif. 90028
Filed Apr. 30, 1965, Ser. No. 452,083
8 Claims. (Cl. 321—24)

ABSTRACT OF THE DISCLOSURE

This disclosure relates to a power supply in which the primary of the input transformer is in series with a switch that is closed only for a very short time during the rising portions of the input AC sine wave half-cycles. The switch closing pulses are positioned such that the energy storage capacitor incorporated in the circuit is charged to a voltage determined by the control circuit providing the pulses. As a result, the input transformer size (iron content) can be reduced by a factor of from 10 to 20, and the regulator heat is minimized since the storage capacitor is never charged to a voltage higher than necessary.

---

This invention relates to AC-to-DC converters and more particularly to a DC power supply utilizing an active switch in the AC input power circuit for asserting effective and novel operational control at all times and under various operating conditions.

In general, the input frequency of most power supplies is relatively low, usually the 60 c.p.s. available commercially; for this reason, the energy for the DC output must be stored in some form. The usual method is to employ inductors, capacitors or both to first achieve some unregulated voltage level and then to follow this with an active regulator to obtain a substantially constant DC output. In some systems, inductors are employed for filtering purposes; in these, the limiting factor concerns geometry for not only the filter inductor but also for the input transformer which must meet some minimum size requirement.

Most systems in use at present use a method of peak-charging an energy storage capacitor, which is followed by an active regulator; but these systems still have the disadvantage of requiring a large input transformer since, in such systems, the process of peak-charging the energy storage capacitor takes place during a small portion of the input sine wave half-cycle. To cope with the input voltages, the transformer size cannot be reduced below some certain minimum. A further disadvantage is the voltage fluctuations common with commercially available AC power and, in many cases, the output DC voltage variations both of which either result in power waste, if the regulator is of the active series or shunt type or result in increased regulator complexity if the regulator employs some switching scheme.

With the above in mind, a primary object of the present invention is to provide a novel power supply in which the foregoing problems are overcome.

More particularly, an object is to provide a power supply in which the input transformer may be made considerably smaller than that required for conventional power supplies of the same capacity with a resultant savings in transformer losses, weight and bulk.

Other objects are to provide an improved power supply in which less heat dissipation is required, which is more efficient, and more reliable and economical to manufacture than presently known power supplies of equal capacity.

Briefly, these and other objects and advantages of this invention are attained by providing a power supply including an energy storage capacitor followed by an active regulator. The capacitor is peak-charged through a transformer having in its input power circuit an active switch which is driven in such a way that it stays closed only once during a small portion of each input sine wave half-cycle. The resultant drive is a series of narrow pulses of constant width and alternating polarity. By properly positioning the "on" time of the input active switch, the energy storage capacitor is charged to only that voltage above the output DC voltage, sufficient for the active regulator to function properly. Should the AC input or the DC output voltages change, the "on" pulse is repositioned accordingly so that the regulator such as the series type is not required to remove much power even under load fault conditions. In other words, less heat need be dissipated, meaning that cooling requirements as well as size are therefore substantially reduced and reliability significantly enhanced.

In addition, the "on" time of the input active switch is properly delayed under conditions of increasing load current so that the energy storage capacitor is charged to a slightly higher voltage to account for the increased rate of discharge attendant with increased current flow. Isolation between the DC output and the AC input is provided by the use of the input transformer, but since the input pulses are narrow, the size of this input transformer is not very critical and therefore can be much smaller, on the order of one tenth relative to that necessarily required in a comparable conventional type power supply. This means that the input transformer losses due to peak-charging the energy storage capacitor are also substantially reduced by about the same factor.

The result is an improved power supply in which the energy to be removed in the form of heat is substantially reduced, the cooling requirements as well as the geometrical limitations and therefore the costs of manufacture and acquisition are significantly lowered and yet the performance and reliability levels are greatly improved.

A better understanding of the invention as well as other features and advantages will be had by reference to the following description taken in conjunction with the accompanying drawings, in which.

Figure 1:
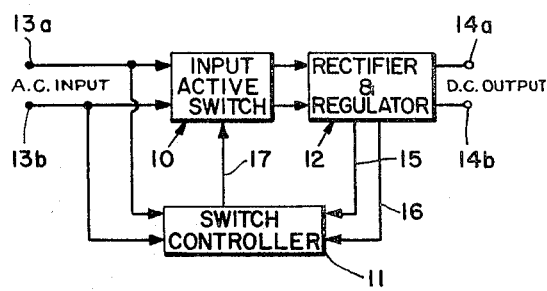
FIGURE 1 is a block diagram of a power supply in accordance with the invention.

Referring to FIGURE 1, shown there in block diagrammatic form is a power supply according to the invention comprising an input active switch 10, a switch controller 11, and a conventional power rectifier and regulator assembly 12. A source of AC power is connected to switch controller 11 through terminals 13a and 13b and to assembly 12 through the input active switch 10. The switch controller 11 receives signals from assembly 12 representative of changes in both the output voltage and the load current over leads 15 and 16 respectively; in response to these variations at the output terminals 14a and 14b together with changes of the input voltage at terminals 13a and 13b, a control signal is transmitted over a cable 17 to operate the input active switch 10 in a manner to be described.

Figure 2:
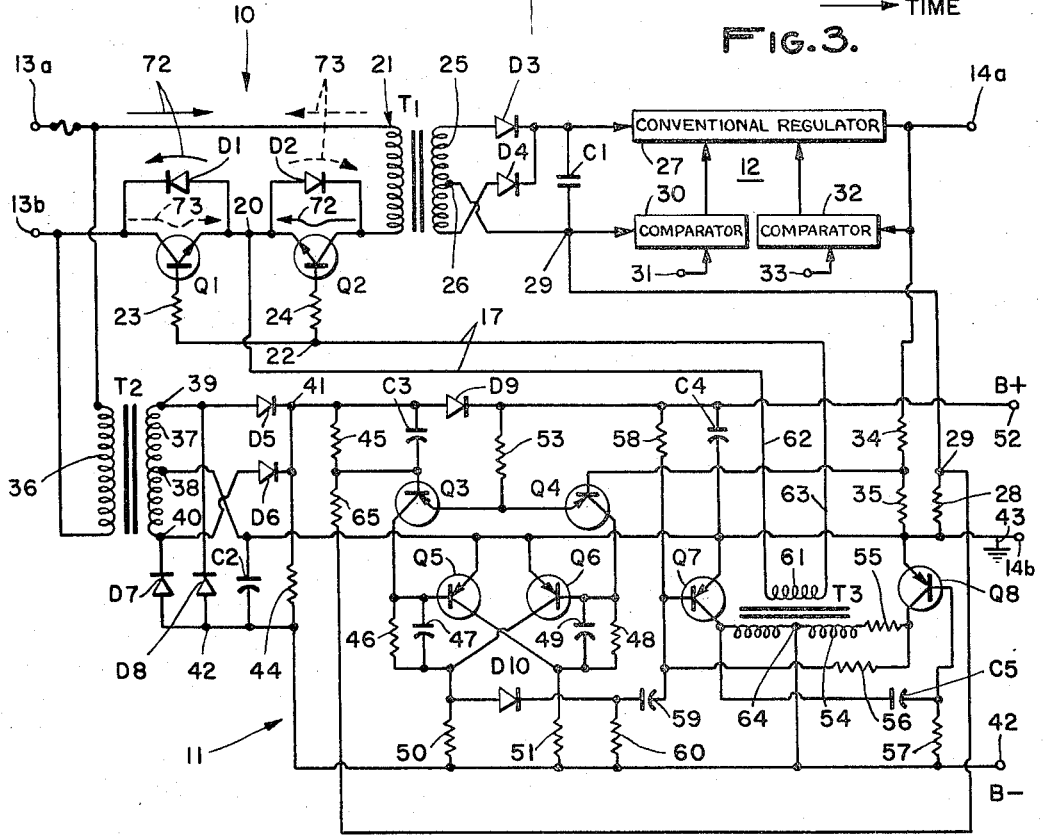
FIGURE 2 is a detailed circuit diagram of the input active switch and the switch controller components as shown in FIGURE 1; and, FIGURE 3 comprises selected wave forms useful in describing the operation of the invention.

Referring now to FIGURE 2, the input active switch 10 comprises transistors Q1 and Q2 having their emitters tied together at a junction 20. A diode D1 has its anode terminal connected to the junction 20 and its cathode connected to the collector of transistor Q1, which collector is further connected to input terminal 13b. A diode D2 has its anode terminal similarly connected to the junction 20 and its cathode terminal to the collector of transistor Q2. The input terminal 13a is connected to an input transformer T1 at one terminal of a primary winding 21; its other terminal is connected to the collector of transistor Q2. Each base of transistors Q1 and Q2 is connected to a junction 22 through resistors 23 and 24, respectively.

The power rectifier and regulator assembly 12 includes the input transformer T1 comprising the primary winding 21 and a secondary winding 25 having a center tap 26. The end terminals of secondary winding 25 are, for illustrative purposes, connected to the anode terminals of diodes D3 and D4. An energy storage capacitor C1 is connected between the cathodes of diodes D3 and D4 and the center tap 26. The rectified voltage appearing at the cathodes of diodes D3 and D4 is fed to a conventional regulator 27 whose output is connected to output terminal 14a. The output terminal 14b is connected, in turn, to the capacitor C1 through a resistor 28 to form a junction 29 which is further connected to center tap 26. A comparator 30 is provided for comparing the signal present at junction 29 with a reference signal supplied at a terminal 31, comparator 30 being of the type for limiting current flow output. Another comparator 32 is provided for comparing the output voltage at terminal 14a with a reference voltage supplied to a terminal 33. A voltage divider comprising serially connected resistors 34 and 35 is tied across output terminals 14a and 14b.

The switch controller 11 includes a transformer T2, which may be a small auxiliary power supply transformer, for driving the pulse-positioning circuits to be described and for providing the reference voltages for the main power supply since its output voltage may be set close to zero and as such would not be enough to properly drive such reference sources. Energy storage capacitors C2 and C4 are provided, as will be described, for the auxiliary unregulated voltage levels.

The transformer T2 includes a primary winding 36 connected across the AC power input terminals 13a and 13b. A secondary winding 37 having a center tap 38 is provided with end terminals 39 and 40 respectively connected to the anode terminals of diodes D5 and D6 and to the cathode terminals of diodes D8 and D7. The cathode terminals of diodes D5 and D6 are tied together at a junction 41 which is further connected to the anode terminal of a diode D9; the anode terminals of diodes D7 and D8 are similarly tied together at a junction 42 which is further connected to the center tap 38 through the capacitor C2. The center tap 38 is also connected to output terminal 14b and to ground reference potential as indicated by reference number 43. A resistor 44 is connected between junctions 41 and 42.

A capacitor C3 and a resistor 45 are connected in parallel combination between junction 41 and the base of a transistor Q3. The emitter of transistor Q3 is connected to the emitter of transistor Q4, the base of which is connected to the junction of resistors 34 and 35. The collectors of transistors Q3 and Q4 are, in turn, connected to the respective base of transistors Q5 and Q6 both of which have their emitters tied to ground potential at output terminal 14b. The base of transistor Q5 is further connected to the collector of transistor Q6 through a parallel combination comprising a resistor 46 and a capacitor 47. Similarly, the base of transistor Q6 is further connected to the collector of transistor Q5 through another parallel combination comprising a resistor 48 and a capacitor 49. The collectors of transistors Q6 and Q5 are also connected to B⁻ voltage present at terminal 42 through resistors 50 and 51 respectively.

The cathode of diode D9 is connected to one side of capacitor C4 and to a terminal 52 at which B+ voltages may be obtained. The other side of capacitor C4 is connected to terminal 14b or ground reference potential. B+ voltages are supplied to the comparator comprising transistors Q3 and Q4 through a resistor 53 connected between terminal 52 and the emitters of transistors Q3 and Q4. With this arrangement, a portion of the DC output voltage available across the terminals 14a and 14b, is applied, via the voltage divider comprising the resistors 34 and 35, to the base of the transistor Q4. At the base of transistor Q3 is applied a portion of the unfiltered rectified voltage of the AC input sine wave. When the voltage at the base of transistor Q3 is less than that at the base of transistor Q4, the latter is cut off and the former is conductive. When transistor Q3 conducts, transistor Q6 also conducts and transistor Q5 is cut off. When transistor Q3 cuts off, transistor Q4 conducts causing transistor Q6 to cut off and transistor Q5 to conduct; meaning the the state of the flip-flop comprising transistors Q5 and Q6 changes each time transistor Q3 changes state.

The base current for the input active switch 10 is supplied by a constant-pulse-width driver which includes a transformer T3 and transistors Q7 and Q8, both of which have their emitters connected to ground potential at terminal 14b. The collector of transistor Q7 is connected to the base of transistor Q8 through a capacitor C5 and also to the collector of transistor Q8 through a series circuit connection comprising a primary winding 54 of the transformer T3 and a resistor 55. The collector of transistor Q8 is, in turn, connected to the base of transistor Q7 through a resistor 56 and the base of transistor Q8 to B⁻ at terminal 42 through a resistor 57. The base of transistor Q7 is also connected to B+ at terminal 52 through a resistor 58 and to B⁻ through a series circuit combination comprising a capacitor 59 and a resistor 60.

A secondary winding 61 of transformer T3 has its terminals connected to junctions 20 and 22 of the input active switch 10 via leads 62 and 63 which form cable 17 as seen in FIGURE 1. The primary winding 54 of transformer T3 includes a center tap 64 which is connected directly to B⁻ at terminal 42. A diode D10 is provided with its anode and cathode terminals connected respectively to the collector of transistor Q6 and to the junction of capacitor 59 and resistor 60. The base of transistor Q3 is also connected through a resistor 65 to the junction 29 of capacitor C1 and resistor 28 of the assembly 12.

Figure 3:
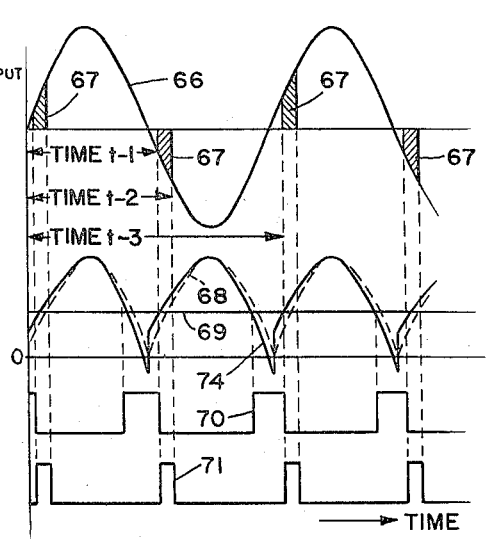

In operation, electrical power is applied at input terminals 13a and 13b having a sinusoidal wave form as shown in FIGURE 3 by a wave form 66. This input voltage is applied across the primary winding 36 of transformer T2 and would also be applied across the primary winding 21 of transformer T1 under conditions rendering transistors Q1 and Q2 of the input active switch 10 at all times conductive. However, as is explained below, transistors Q1 and Q2 are only disposed in a conductive state for a finite time interval during each half cycle of the input sine wave. As a result, the input voltage applied across the primary winding 21 of transformer T1 is a series of narrow constant width pulses 67 of alternating polarity as shown by the shaded portion under the voltage wave form 66. The output of transformer T1 then is a similar train of narrow pulses suitably transformed in voltage to be rectified by diodes D3 and D4 and used to peak charge the energy storage capacitor C1.

The voltage appearing across the secondary winding 37 of transformer T2 is rectified by diodes D5 and D6 and a portion of this rectified unfiltered sine wave, shown in FIGURE 3 by a dotted wave form 68, is applied to the base of transistor Q3 through a voltage divider comprising resistors 45 and 65. The voltage on the base of transistor Q4 is proportional to the output voltage available at the terminals 14a and 14b due to the voltage divider comprising resistors 34 and 35. A wave form 69 shown in FIGURE 3 represents the voltage developed across resistor 35 that is applied to the base of transistor Q4. When the wave form 68 is above the wave form 69, transistor Q4 conducts and transistors Q3 and Q6 are cut off. In other words, whenever the voltage at the base of transistor Q3 is less than that voltage represented by the wave form 69, transistors Q3 and Q6 are conducting, the voltage wave form at the collector of the latter being shown by a wave form 70 in FIGURE 3. During conduction, the voltage at the collector of transistor Q6 rises, and upon cut off, the voltage drops to trigger transistor Q7, which is normally cut off, into conduction. This, in turn, drives transistors Q1 and Q2 into conduction through transformer T3.

The base current for transistors Q1 and Q2 is supplied by the constant-pulse-width driver comprising transformer T3, transistors Q7 and Q8, and associated resistors and capacitors. Initially, transistor Q8 conducts cutting off transistor Q7. When the voltage at the collector of transistor Q6 goes down as is shown to occur at time $t-1$, for example in FIGURE 3, transistor Q7 conducts causing its collector voltage to rise as indicated by a wave form 71. This cuts off transistor Q8 through capacitor C5 and regenerative action takes place due to positive feedback to the base of transistor Q7 through resistor 56. The collector of transistor Q7 drives transistors Q1 and Q2 into conduction through transformer T3. The time interval during which transistors Q1 and Q2 conduct is determined by capacitor C5 and resistor 57 and as soon as capacitor C5 discharges through resistor 57, transistor Q8 returns to a conductive state turning off transistor Q7; transistors Q1 and Q2 are also turned off until the next half cycle when the collector voltage at transistor Q6 again goes down as shown in FIGURE 3 to occur at time $t-3$. As seen in FIGURE 3, the difference between time $t-2$ and time $t-1$ represents the time interval during which transistors Q1 and Q2 are disposed in a conductive state; it also represents the time during which transistor Q8 is cut off; and finally, it also represents the time during which capacitor C5 is discharging through resistor 57.

Assume for the moment that the input active switch 10 is turned on, i.e. transistors Q1 and Q2 are both conductive. In the forward direction, as indicated by the solid arrow 72, transistor Q2 and diode D1 conduct since normally the transistor is a poor switch for reverse heavy current; when the input sine wave changes polarity, as has shortly occurred before time $t-1$ in FIGURE 3, transistor Q1 and diode D2, in turn, conduct as shown in FIGURE 2 by a dashed arrow 73. At all other times, i.e. when the input active switch 10 is turned off, transistors Q1 and Q2 are non-conductive and, since diodes D1 and D2 are connected back to back, an open-circuit condition exists in the input power circuit to transformer T1. Stated differently, during alternate half cycles of the input sine wave and then only during the times when transistor Q7 is conducting and transistor Q8 is cut off, there exists a finite time interval that may be advanced or delayed accordingly as will be described during which transistor Q2 and diode D1 conduct; during all other half cycles and under the same conditions, there exists an identical time interval during which transistor Q1 and diode D2 conduct. This results in charging capacitor C1 to a voltage just a little in excess of the output D.C. level regardless of the values of the input A.C. or output D.C. levels. In short, transformer T1 sees narrow alternating-polarity pulses 67 the height of which is determined by the position of the input active switch "on" pulses, as also represented by the wave form 71.

In FIGURE 3, note that the height of each finite "input switch on" pulse 67 follows the envelope of the input voltage wave form 66. Thus, for example at time $t-2$, the height of the "on" pulse is greater than that at the earlier time $t-1$, i.e., the trailing edge pulse height is larger than the leading edge pulse height. This is always true since transistor Q3 is only cut off during the rising portion of each input A.C. power half cycle causing transistor Q6 to cut off thus triggering transistor Q7 into conduction to drive transistors Q1 and Q2 into conduction through transformer T3. This means that capacitor C1 would be overcharged somewhat unless some sort of compensation is provided. This then is the purpose of capacitor C3, to provide compensation for this difference in leading and trailing edge pulse heights. Note that if the conditions are such that the input active switch 10 is closed or turned on close to the crest of the input sine wave, the height of the trailing edge of the resulting charging pulse does not differ much from the height of the leading edge. However, if the switch 10 is turned on close to the start of the input sine wave, the trailing edge may be much higher than the leading edge. By placing capacitor C3 between the base of transistor Q3 and the junction 41, the voltage on the base of transistor Q3 is raised by an amount proportional to the rate of change of the input sine wave voltage. This advances the "input switch on" pulse in time by an amount proportional to that rate of change, in other words to time $t-1$. The voltage on the base of transistor Q3 due to capacitor C3 is shown in FIGURE 3 by a wave form 74 which it is seen crosses the wave form 69 representative of the voltage on the base of comparator transistor Q4 at an earlier time than does the unfiltered rectified sine wave form 68. Without such compensation, the capacitor C1 would be overcharged because the comparator would otherwise give the "on" command based on the leading edge voltage, i.e. at that time when wave form 68 crosses wave form 69.

Further refinement is provided to delay the "input switch on" pulse more and more as the load current being supplied becomes heavier and heavier. To achieve this, the voltage drop across resistor 28 is used to modify the "comparator-change-state" voltage at the base of transistor Q3. The resistor 28 is a small current-sampling resistor for the output load, the voltage developed across it being proportional to the load current. The result is that transistor Q3 is cut off at a later time and causes a corresponding delay of the "input switch on" pulse. Thus, capacitor C1 is charged to a proportionately higher voltage which is necessary to compensate for the higher rate of discharge than occurs with heavier load current. Under no load conditions, no voltage drop occurs across resistor 28 and no delay component is involved in the positioning of the "input switch on" pulse.

Suppose in a conventional power supply having an output voltage of say 50 volts and a current limit control that takes over at say 2 amperes, the existence of a load fault short-circuiting this power supply would require the regulator to either dissipate over 100 watts of power or else burn out. With the present invention, the regulator would still limit at 2 amperes but now, since the load voltage would drop to zero, transistor Q3 if turned on at all would cut off very early during each input half cycle to turn on input active switch 10 for that finite time interval equal to the difference between times $t-1$ and $t-2$. As a result, capacitor C1 would be charged to only a few volts with only a small amount of power, in the order of 5 watts, to be dissipated as compared to over 100 watts in the conventional design. And, when the short is removed, the voltage across capacitor C1 would gradually build up to the required value over a few cycles and normal operation would be restored.

The fact that short circuit operation can be safely handled without requiring the regulator to dissipate large amounts of power, a power supply according to the invention may be relatively small in size and need not be burdened with complicated and expensive cooling devices nor require large input transformers as typically necessary in the conventional power supply design. Instead, the input transformer may be substantially smaller, the allowable size being proportional to the shaded area under the wave form 67 relative to the wave form 66. Stated differently, the volt-ampere rating of the input transformer in a power supply according to this invention may be substantially equal to the power input in volt-amperes as decreased by the ratio of the area under the wave form 67 to that area under the wave form 66 during any half-cycle and still there remains a highly dependable source of DC power.

Although my invention is fully capable of achieving the results and providing the advantages hereinbefore men-

What is claimed is:

1. In a power supply for converting AC power to DC power and including an energy storage capacitor and a regulator for developing a regulated DC output voltage, the combination comprising: switch means electrically coupled to said AC power supply in the input power circuit; and control means coupled to said switch means and to said regulator for operating said switch means in such a manner that the switch means is closed only when a constant width pulse is applied by the control means, said switch means at all other times being open, said pulse for closing said switch means occurring during the rising portion of the input sine wave half-cycle with the position of said pulse relative to the rising portion of the sine wave determined by the regulator output voltage and the input AC voltage so that when said switch means closes, the energy storage capacitor is charged to a voltage only a slight amount above the regulator output voltage such that the regulator will not have any more than the necessary voltage across it thereby minimizing the heat dissipation in the regulator.

2. The combination as set forth in claim 1, in which said control means includes means for advancing the time of occurrence of said pulse by an amount proportional to the rate of change of said AC input half-cycle during the period said switch means is closed.

3. The combination as set forth in claim 1, further characterized in that said control means includes means for delaying the time of occurrence of said pulse by an amount proportional to the output current being supplied by said power supply.

4. An AC-to-DC converter comprising, in combination: a power supply having an input transformer, an energy storage capacitor, and a regulator for developing a regulated DC output voltage; a source of AC power; switch means coupled to said input transformer in the input circuit thereof and including first and second transistors and first and second back-to-back connected diodes having their cathode and anode terminals respectively connected to the emitter and collector electrodes of said first and second transistors, the collectors thereof being serially connected to said AC power source and to said input transformer; and control means coupled to said switch means and to said regulator and including comparator means for comparing the voltage of said AC power source with the said DC output voltage to develop a trigger voltage; bias means responsive to said trigger voltage for supplying base current to said first and second transistors to bias same into conduction for a predetermined time interval during the rising portion of each AC input half-cycle, said first diode and said second conducting transistor providing a conductive path for current flow in the forward direction to said input transformer and in the reverse direction by the other diode and conducting transistor to charge said capacitor with a series of narrow pulses to a voltage substantially equal to said DC output voltage.

5. The AC-to-DC converter as set forth in claim 4, in which said comparator means includes capacitive means for advancing in time said predetermined time interval by an amount proportional to the rate of change of the voltage from said AC source during said predetermined time interval.

6. The AC-to-DC converter as set forth in claim 4, in which said comparator means includes load current sampling means for delaying in time said predetermined time interval by an amount proportional to said load current supplied by said power supply.

7. A power supply for converting AC power to DC power comprising, in combination: an input circuit for receiving an input AC signal; an output circuit for developing a regulated DC output voltage; a transformer coupling said input circuit to said output circuit; and means in said input circuit for connecting and disconnecting the input AC signal to said transformer during the rising portions of the sine wave half-cycles of said input signal to define a portion constituting a given fraction less than one-fourth of each input half-cycle of said AC signal to said input transformer so that said input transformer receives a series of narrow pulses, whereby the size and rating required of said input transformer is reduced substantially by said given fraction.

8. In a power supply for converting AC power to DC power and including an input transformer having a predetermined volt-ampere rating and an energy storage capacitor, the combination comprising: switch means electrically coupled to said transformer in the input circuit thereto and control means for turning said switch means on to provide circuit continuity to said transformer for a time interval during the rising portion of each input half-cycle and off for the remaining portion of said half-cycle to charge said capacitor with a chain of constant width pulses at double the input frequency, whereby the ratio of the area under the curve during the on time of the switch to the area under the complete input AC sine wave half cycle defines the reduction of the input transformer size which can be effected.

References Cited

UNITED STATES PATENTS

| | | | |
|---|---|---|---|
| 3,183,429 | 5/1965 | Baycura et al. | 321—18 |
| 3,287,623 | 11/1966 | Valancius | 323—22 |
| 3,289,069 | 11/1966 | Todd | 321—18 |

JOHN F. COUCH, *Primary Examiner.*

W. H. BEHA, *Assistant Examiner.*